United States Patent [19]

Ragle et al.

[11] Patent Number: 4,458,277

[45] Date of Patent: Jul. 3, 1984

[54] SPACERS FOR END-WISE PNEUMATIC PARTITIONED DISK PACK

[75] Inventors: Herbert U. Ragle, Thousand Oaks; Dean De Moss, Camarillo, both of Calif.

[73] Assignee: Burroughs Corporation, Detroit, Mich.

[21] Appl. No.: 292,072

[22] Filed: Aug. 12, 1981

Related U.S. Application Data

[63] Continuation of Ser. No. 092,728, Nov. 9, 1979, abandoned, which is a continuation-in-part of Ser. No. 049,553, Jun. 18, 1979, abandoned, which is a continuation of Ser. No. 890,799, Mar. 27, 1978, Pat. No. 4,167,029, which is a continuation-in-part of Ser. No. 711,647, Aug. 4, 1976, Pat. No. 4,086,640.

[51] Int. Cl.$^3$ .................... G11B 5/016; G11B 25/04
[52] U.S. Cl. ........................................ 360/99; 360/133
[58] Field of Search ................... 360/97–99, 360/133–135; 206/444, 312

[56] References Cited

U.S. PATENT DOCUMENTS

| | | | |
|---|---|---|---|
| 3,867,723 | 2/1975 | Penfold et al. | 360/99 |
| 3,969,767 | 7/1976 | Griffiths et al. | 360/99 |
| 3,994,017 | 11/1976 | Bakhuff et al. | 360/99 |
| 4,011,591 | 3/1977 | Orlando et al. | 360/99 |
| 4,118,746 | 10/1978 | Gyi et al. | 360/99 |
| 4,185,311 | 1/1980 | Gyi et al. | 360/99 |

*Primary Examiner*—Stuart N. Hecker
*Attorney, Agent, or Firm*—John J. McCormack; Nathan Cass; Kevin R. Peterson

[57] ABSTRACT

Improved disk drive equipment is illustrated, being characterized by improved end-wise pneumatic partitioning means for deflecting selected flexible magnetic recording disks and featuring improved "external" pneumatic partition means for directing partitioning air to be injected end-wise and axially up the pack as a jet stream through bores in the disks and spacers into a gap between any two disks—these bores terminating at respective gaps where the spacer means is radially cut-out to divert the axial air stream to its associated inter-disk gap.

11 Claims, 12 Drawing Figures

SPACERS FOR END-WISE PNEUMATIC PARTITIONED DISK PACK

CROSS-REFERENCE TO RELATED APPLICATIONS

This is a continuation, of Application Ser. No. 092,728, filed Nov. 9, 1979, abandoned.

Ser. No. 092,728 is a continuation-in-part of Ser. No. 049,553, filed June 18, 1979, now abandoned in favor of Ser. No. 228,058, filed Jan. 26, 1981.

Ser. No. 049,553 is a continuation of Ser. No. 890,799, filed Mar. 27, 1978, now U.S. Pat. No. 4,167,029, which is in turn a continuation-in-part of Ser. No. 711,647, filed Aug. 4, 1976, now U.S. Pat. No. 4,086,640. The foregoing were filed on behalf of the same inventors, are commonly assigned and are herewith incorporated by reference.

This and the following commonly assigned, recently filed patent applications are related to the subject matter of this application and are herewith incorporated by reference.

Ser. No.: 711,579 filed Aug. 4, 1976 now U.S. Pat. No. 4,134,144

Ser. No.: 711,628 filed Aug. 4, 1976 now U.S. Pat. No. 4,134,143

Ser. No.: 720,905 filed Sept. 7, 1976 now U.S. Pat. No. 4,136,368

Ser. No.: 720,910 filed Sept. 7, 1976 now Abandoned in favor of Ser. No. 922,024 now issued as U.S. Pat. No. 4,152,739

Ser. No.: 766,288 filed Feb. 7, 1977 now U.S. Pat. No. 4,086,641

Ser. No.: 864,011 filed Dec. 23, 1977 now Abandoned in favor of Ser. No. 960,267 filed Nov. 6, 1978 in turn abandoned in favor of Ser. No. 155,366, filed June 2, 1980.

BACKGROUND AND FEATURES OF THE INVENTION

This invention relates to data recording and in particular to novel improved multi-disk arrangements of data records and to associated means for automatically partitioning them.

Workers in the art of generating and using flexible recording disks are aware of its various advantages and shortcomings. As mentioned in the cited U.S. Ser. No. 711,647, magnetic disks have well known advantages, and in the form of "flexible disks" can serve as a "unit record" medium that is compact, light, and is readily transported, stored, and handled, interchangeably with other like disks. Flexible (or "floppy") disks are now widely used in the data processing arts.

Workers recognize that costs may be reduced in many cases by replacing a rigid magnetic recording disk with a "floppy" disk. Floppy disks can be fashioned from well-known polyester sheet material (e.g., the familiar polyethylene terephthalate used for magnetic tape) with a magnetic coating thereon—this plastic being simply cut into the shape of a circular disk with a central mounting hole to accommodate the familiar drive-spindle. Packs of such "prior art" floppy disks are well known to workers; e.g., as shown in FIG. 1; with a conventional disk therefrom illustrated in FIG. 2.

The present invention is directed toward improving the design of such "floppy packs" and of associated spacer means such that automatic pneumatic partition means may be employed to split the pack and expose any selected disk surface. That is, an improved inter-disk spacer for a "floppy disk pack" according to the invention is particularly adapted for such automatic partitioning—using surprisingly simple means and methods as described hereinafter.

Prior efforts with flexible disks:

Workers are familiar with prior approaches to the design and manufacture of floppy disks and to related equipment for handling them. Several are described in U.S. Pat. No. 4,086,640.

Workers are aware that for many applications of floppy disk pack applications, it is of paramount importance to minimize disk cost while yet maintaining accurate, reliable operation. Thus, it is often desirable to fabricate all floppy disks in a pack by a single common pressing operation, with all disks identical—yet still render the disks uniquely "selectable" when collected into a pack. The invention teaches this, and other techniques, using simple partitioning expedients. For example, with the invention a relatively conventional disk pack may be pneumatically partitioned with jet-select means disposed permanently on the associated drive and without locating, or manipulating, mechanical elements within the pack itself.

The present invention is directed toward providing improved multi-disk record units (disk packs) which are better adapted to meet the foregoing problems and objectives in a manner satisfying minimum-cost objectives. The invention maintains the convenience of packaging a number of floppy disks in an "end-wise" partitionable file, while prescribing improved simplified techniques for partitioning with mechanical select elements outside the pack. This file may take the form of a few floppy disks bound together in portable pack or many "floppies" permanently affixed upon a hollow spindle (either being pneumatically partitioned from within the stack's hub).

As mentioned, the function of partitioning with jet-select means has been proposed heretofore in several, rather problablematical techniques involving the mechanical elements injected into the confines of a floppy disk pack—something which is best avoided for many reasons (e.g., to maintain simplicity of pack construction and interchangability between packs, etc.). One such technique (described in some of the cited applications) involves a perforation of the floppy disks themselves and the intrusion of mechanical "select-fingers" into the confines of the pack. Various disadvantages inhere in such a technique, such as the requirement for completely arresting pack rotation—something ill-advised if one wishes to minimize "access time".

A related jet-select technique (also mentioned in some of the cited applications) locates a distributor piston within the pack-hub and affords "jet-select" by positioning a port opposite a selected inter-disk spacer. The subject invention avoids the problems associated with injecting mechanical means into the confines of the disk pack and operates to switch partition jets between disk spacers with means disposed completely outside the confines of the pack—thereby providing pneumatic, "end-wise" partitioning of the pack.

Workers will appreciate many advantages inhering in this approach to pneumatic partitioning—one being that it uses relatively simple conventional machine elements and can accommodate a relatively conventional flexible pack structure—except, of course, that inter-disk spacers must be apertured in a prescribed pattern and cut-out radially.

Most importantly, the invention allows for pneumatic partitioning of a floppy pack without stopping the hub—or even slowing it down—and avoids the associated loss of time and energy, etc. The invention also partitions without need for placing a piston within the pack-hub and without any of the related axial-positioning means (such an axially translatable piston being disclosed in the cited applications). Such intra-hub pistons complicate pack structure (e.g., either each pack must be made to include such a piston, or else the related drive must be fitted with such a piston and the pack adapted to be coupled to it). And such intra-hub pistons are inherently tricky to position; for instance, the jet orifice must be very precisely located so as to distinguish between two adjacent spacers (separated by a few mils or less), yet without leaking significant jet-air through the adjacent spacer. Also, it is typically problematical to efficiently couple such jet ports to a selected spacer.

The substitution of jet select/distributor means outside the pack instead is advantageous in several respects. It can be combined with an array of apertured spacers for the "end-wise" transmission of the partitioning jet streams and direction thereof to the appropriate inter-disk gap. Thus, it brings many obvious advantages, including the ability to relocate mechanical jet-distribution means outside of the crowded conditions and intricate spacing problems). For instance, such an external distributor arrangement allows a designer to amplify the translation distance between spacers virtually at will (i.e., make select-translation as widely spaced as is convenient, such as indicated below with respect to the embodiments of FIGS. 5, 9 or 10). And, in special cases it allows a designer to implement gap-selection without any translation or positioning of mechanical parts—a stunning step-forward in the art (e.g., see FIG. 10 embodiment below).

The present invention is directed towards providing improved flexible disk packs with associated apertured spacer means—means which are better adapted to meet the foregoing problems and objectives.

The foregoing and other features, objects and advantages according to the present invention will be more fully appreciated and become more apparent upon consideration of the following description of preferred embodiments taken in conjunction with the attached drawings, wherein like reference indicia denote like elements.

BRIEF DESCRIPTION OF THE DRAWINGS

FIG. 1 is a rather schematic elevation showing a simplified instructive disk pack arrangement which is "end-wise partitioned" pneumatically, and from within its hub region, with pack rotation means and a transducer assembly indicated in schematic cooperative relation; while

FIG. 6 shows this arrangement in plan, rather schematic view; while

FIG. 11 shows a plan view of a second type of spacer embodiment, while

BACKGROUND OF THE INVENTION

Workers in the art are quite familiar with the design and construction of conventional floppy disks and disk packs as well as associated disk drive and related means to manipulate such disk packs including means for partitioning them. Our cited copending U.S. patent applications give details of such disk packs and related equipment. The cited applications indicate various implementations for the "end-wise partitioning" of a flexible disk pack and disclose partition-apertured disks and associated "end-wise" partitioning means like mechanical ("through-disk") plungers or a pneumatic hub-disposed piston. The following brief description relating to FIGS. 1-4 indicates an example of such pneumatic hub-originated partitioning by way of introduction to embodiments of the invention (see embodiments indicated in FIGS. 11-13 and described below).

Figure 1:
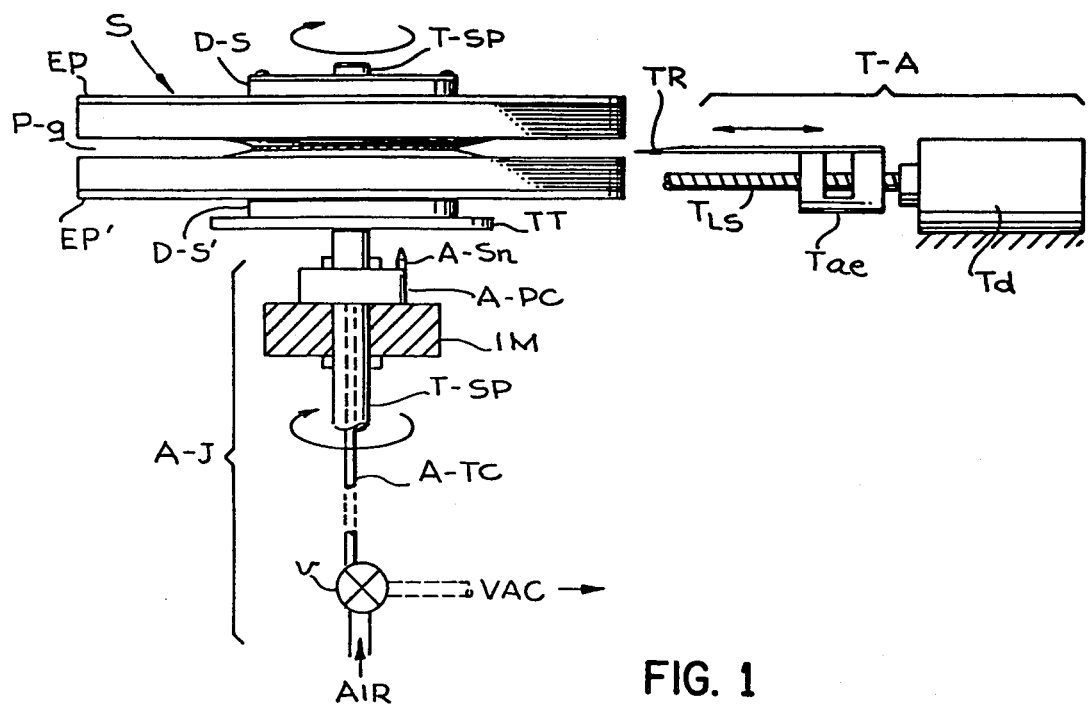

Pneumatic, hub-originated partitioning; FIG. 1:

FIG. 1 schematically suggests a disk pack and associated drive adapted for pneumatic "end-wise" partitioning (e.g., versus the above-discussed mechanical mode). Preferably, partitioning is effected from within the stack's hub, or adjacent thereto, as detailed below.

Figure 2:
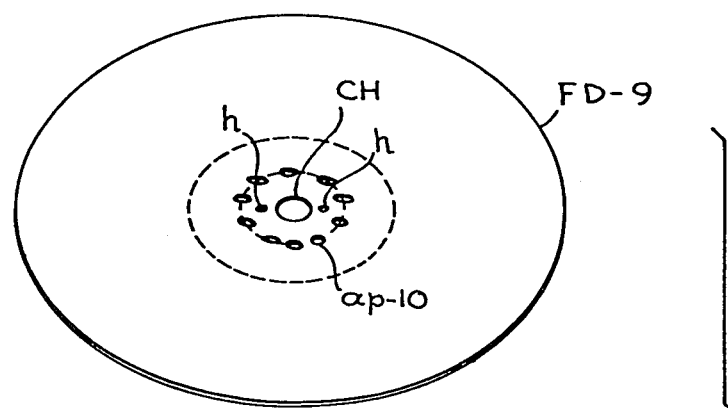
FIG. 2 shows a flexible disk modified therefor.
Figure 2:
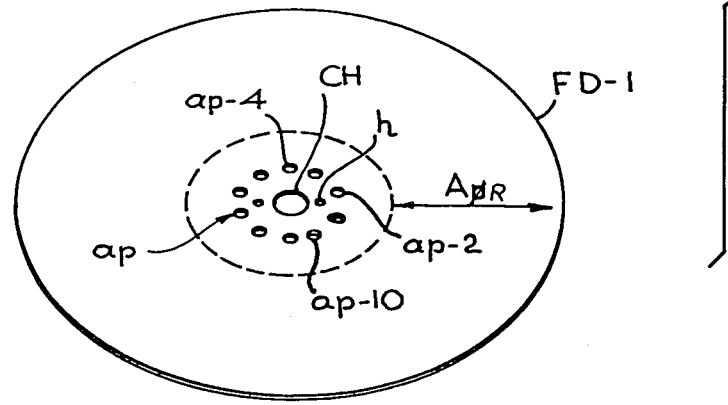
Figure 3:
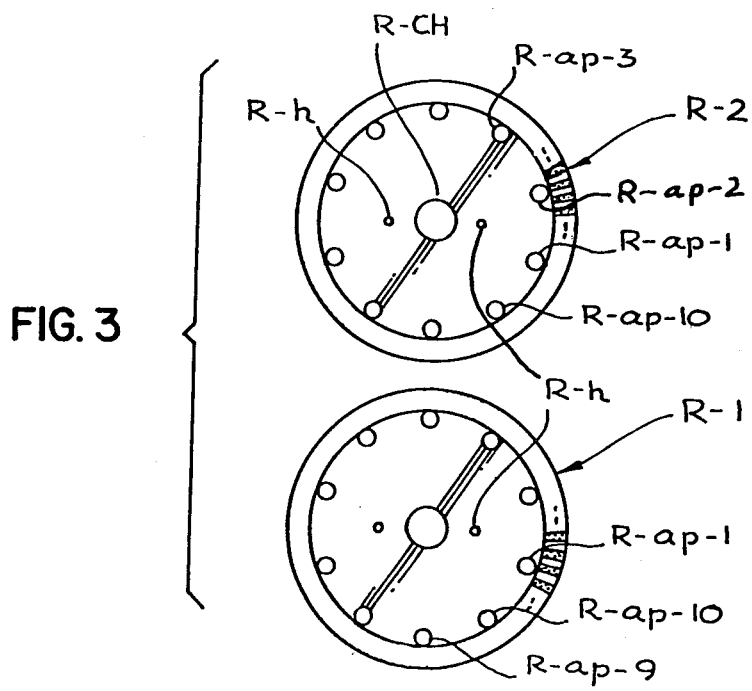
FIG. 3 shows an inter-disk spacer adapted for such partitioning.

Thus, FIG. 1 is a schematic, rather generalized functional showing of a flexible disk pack S mounted on a conventional turntable TT (for relatively high speed rotation) and comprising a stack of flexible disks FD with intermediate spacers R, held together between a pair of collars D-S, D-S' (see also FIGS. 2, 3). Understood will be pneumatic partition means adapted to pneumatically partition the pack for access entry of a conventional transducer mount TR, adapted for high speed non-contact transduction as generally understood in the art. Here, and elsewhere, the materials, mechanisms and systems alluded to should be understood as conventionally constructed and operated as presently known in the art, except where otherwise mentioned.

In this arrangement a stack of high speed rotated floppy disks will be understood as pneumatically partitioned, "on-the-fly" (without interrupting pack rotation) end-wise, and "from without" (i.e., external to the pack)—e.g., as opposed to other designs involving intra-hub partition means or external non-pneumatic and/or non end-wise partition means.

Thus, fixed floppy pack S will be understood as mounted for rotation upon a spindle T-SP and associated turntable TT, pack S comprising a plurality (e.g., here at least 10-20) of flexible magnetic recording disks FD separated by washers R which are "partition-apertured" and radially cut-out according to this feature of invention (as detailed below and indicated particularly in FIGS. 2 and 3). For illustration purposes, a transducer array T-A is indicated and understood as adapted for selective translation (as indicated by arrow) into, and out of, partition gap p-g between the disks in pack S so as to present a prescribed transducer core array TR in non-contact, transducing relation with a prescribed (upper) disk surface. Pack S is here shown as pneumatically hub-partitioned between disks FD-9 and FD-10 by way of example (see FIG. 4).

According to a related feature, the partitioning air, here, supplied to the hub region by an external pneumatic assembly A-J is adapted to present a high speed jet of partitioning air end-wise of pack S and entrained up a prescribed one of the bores generated axially through the array of partitioning-apertured washers and disks, this being controlled according to the rotational position, or indexing, of a delivery jet nozzle A-SN relative to pack S.

Flexible disk pack S will also be understood to be conventionally engaged by a pack rotation assembly for prescribed high speed rotation (the "high performance" systems like those described will be understood to involve disk rotation on the order of at least several thousand rpm). This rotation assembly comprises conventional means, schematically indicated as including a turntable TT and spindle T-SP and an associated drive (e.g., including a motor, belt coupling and associated pulleys and gears, etc., as well understood in the art).

Once pack S is so engaged and so rotated, it is ready for transducer operations on a selected disk, access to which (e.g., by transducer assembly TR, as known in the art) is best facilitated by a (full or partial) "partitioning", sufficient to expose the selected disk surface to accommodate entry of the transducer mount. Here, it should be appreciated that flexible disk packs like those described are particularly apt for "pneumatic" partitioning by selectable jet-streams directed to a selected (inter-disk, radially cut-out) spacer from within the pack-hub as detailed below.

Transducer TR may be of conventional design and is part of a transducer assembly T-A adapted to reciprocate TR (as indicated by the arrow) radially into, and out of, the partition-gap in pack S. The transducer and actuating means may be provided as well known in the art and need not be detailed here. Thus, the transducer mount may be translated axially (e.g., "slaved" to track the partition-select) to seek registry with the plane of a "selected" disk, as is conventional. Transducer/disk loading will preferably be very light (a few grams), and not sufficient to seriously interfere with the separating air stream between adjacent disks.

By way of example only, an actuation drive motor $T_d$ is indicated as coupled to rotate a lead screw $T_{LS}$ on which the head mounting arm is mounted, being threadably engaged thereto via bracket $T_{ae}$ (see details in U.S. Ser. No. 711,647, now U.S. Pat. No. 4,086,640) for precise translation into the pack (e.g., to access specific tracks on a selected disk surface, as is well known in the art and need not be detailed here). As described below, workers will recognize that the heads may be fixed or be suspended upon compliant means adapted to advantageously interact with the air-separated flexible disks according to the invention.

Disk pack (FIG. 4):

Flexible disk pack embodiment S will be understood as comprising a dozen (or a few dozen) floppy disks with associated intermediate spacers R (described below); the spacers being "partition-apertured" to render pack S "end-wise partitionable", pneumatically. Pack S is preferably a removable cartridge type (as known in the art) and may include a surrounding jacket or protective envelope (or shroud), with suitable ports for air exchange.

Thus, coaxial stack S comprises commonly-supported, flexible disk records FD, understood as mounted and retained, along with intermediate spacers R between a pair of opposed flexible end-plates EP, EP', being clamped between collars D-S, D-S'. Disks FD are spaced apart a prescribed uniform distance by identical annular radially-vented separator rings R as known in the art.

Rings R and disks FD are "partition apertured" (as are turntable TT, collar D-S' and end-plate EP') as well as clamped firmly between end-plates EP, EP', by opposed collars D-S, D-S'. The disks and spacers may also be pierced (holes R-h FIGS. 2, 3) to receive coupling means as known in the art (e.g., bolts or rivets to be threaded through holes h in the collars, disks, plates and spacers; or like fastener means used to retain pack S as understood by workers in the art—e.g., preferably including locator-rods as well, though none are illustrated). The inner circumferences of the disks, of the spacers and of the collars, are so stacked and clamped together, as to be relatively congruent, defining the sides of a cylindrical center hole of prescribed diameter and height and adapted to be received on spindle T-SP as known in the art—being rotated on the turntable TT conventionally.

Disks FD; FIG. 2:

Flexible disks FD are of a type known in the art and, as workers will appreciate, may assume various dimensions and compatible constructions. For instance, a well-known polyethylene terephthalate a few mils thick (1.5 mils) is preferred here, with a randomly-oriented ferric oxide coating on at least one side; disk diameter being approximately 12 inches, with a "standard" center-hole diameter about 2.5 inches. The spacers R may comprise accommodating material and dimensions.

Thus, representative disk D, indicated in FIG. 2 will be understood as characterized by an array of partition apertures (see the nine partition apertures ap in FD-1 concentrically disposed about center hole CH), which are disposed adjacent the disk's inner diameter, or hub, rather than its outer diameter. Holes ap will, of course, be understood as stacked in registry to form "bores B" (through spacers R as well) adapted to accommodate different selected axial streams of air, as mentioned elsewhere.

Thus, partition holes ap on all disks will be understood as disposed along a common circumferential axis, closely adjacent center hole CH and within the "recording annulus" defined by a radial segment $A_R$. "Coupling holes" h are provided, as mentioned, to accommodate coupling bolts, or like fasteners, connecting the clamping collars.

According to the preferred construction here indicated, the pattern of partition apertures is arranged and cut-out to be unique for each spacer so that all disks (aperture pattern) may be alike. However, for manufacturing and assembly convenience, workers may use other modes. Thus, here—as before—there is a prescribed number of partition gaps possible and an associated number of aperture sites—the latter being the same for all disks and in registry when the pack is assembled.

Here, nine(9) inter-disk gaps p-g are possible, so there are nine (9) aperture sites. All disk apertures ap are open in the "bottom disk" (closest to air jet—here disk FD-1), while only one is cut-out for the "top disk" (farthest from air jet—here, FD-10—FIG. 4); with the number open increasing between these two (e.g., eight open on FD-3, seven on FD-4, etc., with none open in the disks forming top plate EP, and all open in bottom plate EP').

Alternatively, all ten apertures ap are open for all disks (see below and FIG. 2).

Of course, as mentioned below, the disks are stacked together with the intermediate similarly-apertured spacers so that these ten ap sites register along the stack of disks to form ten "partition bores" as in the preceding embodiments; each bore being a different length and thus terminating at a different disk.

Flexible disks FD will be understood as operating between a pair of flexible stabilizer end-plates, EP, EP', preferably comprising a plurality of contiguous flexible recording disks 55 (identical to the record disks, except that no magnetic coating is needed). Plates EP, EP', fix the pack position axially and remain quite flat, being held so by centrifugal forces. For instance, in one embodiment, with a pack comprising from 10–20 polyester disks 1.5 mil thick separated by 10 mil spacers, satisfactory end-plates are formed.

Of course, it will be understood that, preferably and in most cases, "dummy" disks and associated intermediate spacers (i.e., a pair of "dummy packs") will also be provided at the top and bottom of the record stack (here, adjacent FD-1, and FD-10, respectively) to accommodate a projected full partitioning deflection of record disks—especially the outboard disks FD-1, FD-10. In this case the partition gap p-g is projected at about 150 mils; accordingly, a "dummy pack" D, D' (FIG. 27) will be provided, top and bottom, each sufficient to accommodate a 75 mil deflection (as compressed by the deflection forces, with essentially no gap between dummy disks).

Spacers; FIG. 3:

Spacers R will be understood as adapted to maintain disks axially spaced a prescribed uniform separation distance (here, about 10 to 20 mils preferably). The spacers are vented radially (see peripheral hatching FIG. 3; adjacent a selected aperture R-ap; e.g., adjacent R-ap-2 for R-2; adjacent R-ap-1 for R-1) to allow recording disks to be normally separated and lubricated by a thin film of air, as well as serving, during special partition times, to pass the partitioning air jet. The spacers R are also partition-apertured as indicated above (and further detailed in U.S. Ser. No. 155,366 ) to accommodate the recited end-wise pneumatic partitioning. The "blind-ended" partition bores are preferably generated using the same hole pattern for each spacer and associated like disk holes. Alternatively, different disk (and/or spacer)-aperture patterns may be used to "blind" a respective bore just beyond its associated gap.

Figure 4:
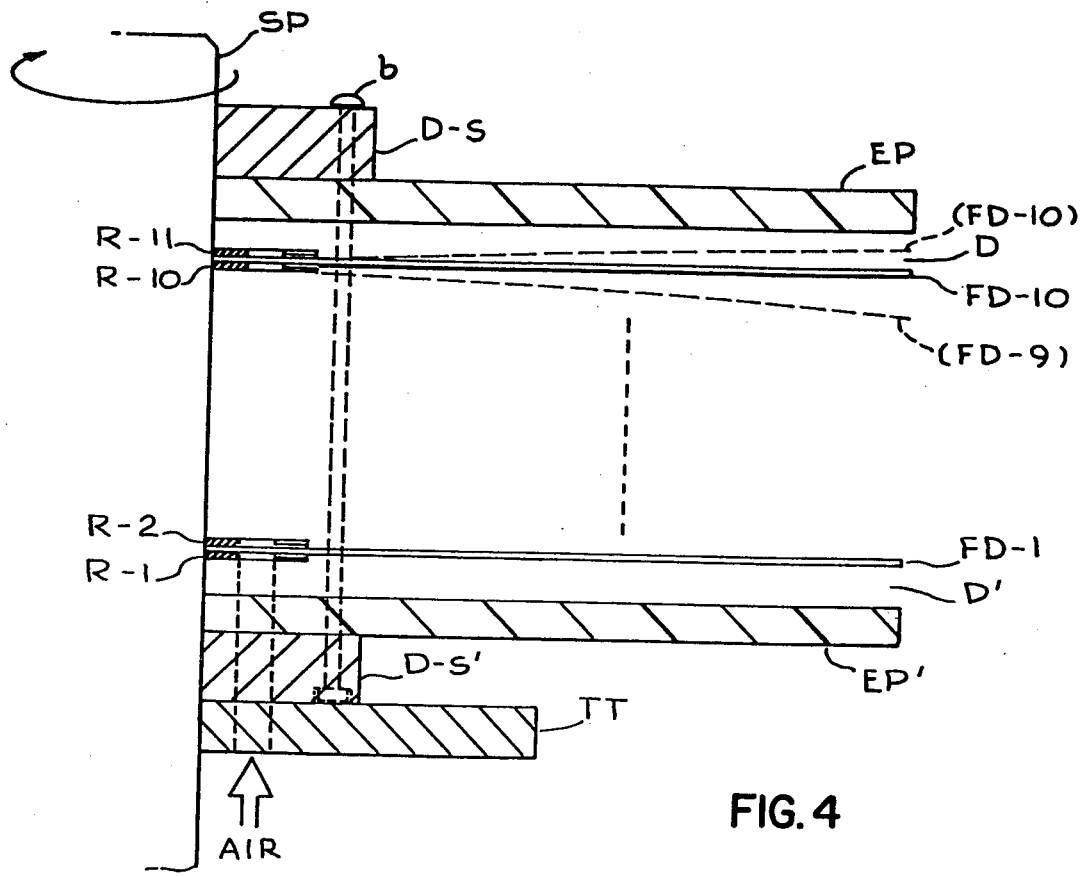
FIG. 4 is an enlarged partial side section of a disk pack as in FIG. 1 schematically indicating apertured spacers, turntable, etc.

More particularly, and with reference to FIG. 4, spacers R will be understood as arrayed in a stack with flexible disks FD therebetween, as indicated (see spacers R-1 through R-11, disks FD-1 through FD-10). That is, for example, an array of partition apertures, R-ap is formed about a prescribed inner circumferential locus about spacer-washer R-1, having center hole R-CH adapted to fit the turntable spindle and an outer diameter sufficient to perform the conventional spacing and mounting functions as well as the added novel function of delivering partition air to a prescribed inter-disk gap.

Apertures R-ap may be distributed in any number or spacing (preferably uniformly) about the annulus. Preferably, the companion washers R-2 through R-11 are so partition-apertured in the identical registering manner. A like array of spacers are provided between the "dummy disks" but only the bottom ones (D') need be partition-apertured.

Partition jet; FIG. 1:

A pressurized air supply (source not shown but well understood in the art) is adapted to be delivered through a conduit, a valve v and hollow center tube A-TC, as known in the art. In this way pressurized air (gas) is delivered to a prescribed sump chamber A-PC, including an associated delivery nozzle A-SN, both understood as co-rotated with pack AS and sealed to fixed central tube via air-tight couplings as known in the art. The nozzle A-SN may be indexed selectively to different circumferential positions about the pack by rotary actuator (phase adjust means) IM, as known in the art. (Rotating chamber A-PC being thus in pneumatic communication with fixed hollow tube A-TC, mounted centrally within hollow spindle T-SP). Here, delivery of the air is effected up through hollow tube A-TC. In particular (and referring to the embodiments of FIGS. 1 and 2), it may be assumed that the partition between disks FD-1, FD-2 is effected by positioning the jet delivery nozzle rotationally with respect to pack AS so as to register with a selected bore (through TT, EP', dummy and record disks as well as intermediate spacers). This jet stream is directed upward through all the intervening spacers and disks to exit, radially, through the washer opposite the "selected" partition gap.

The operation of the elements indicated in FIGS. 1–4 will be apparent to those skilled in the art and in any event are particularly described by way of example in the cited U.S. application (U.S. Ser. No. 155,366).

Figure 5:
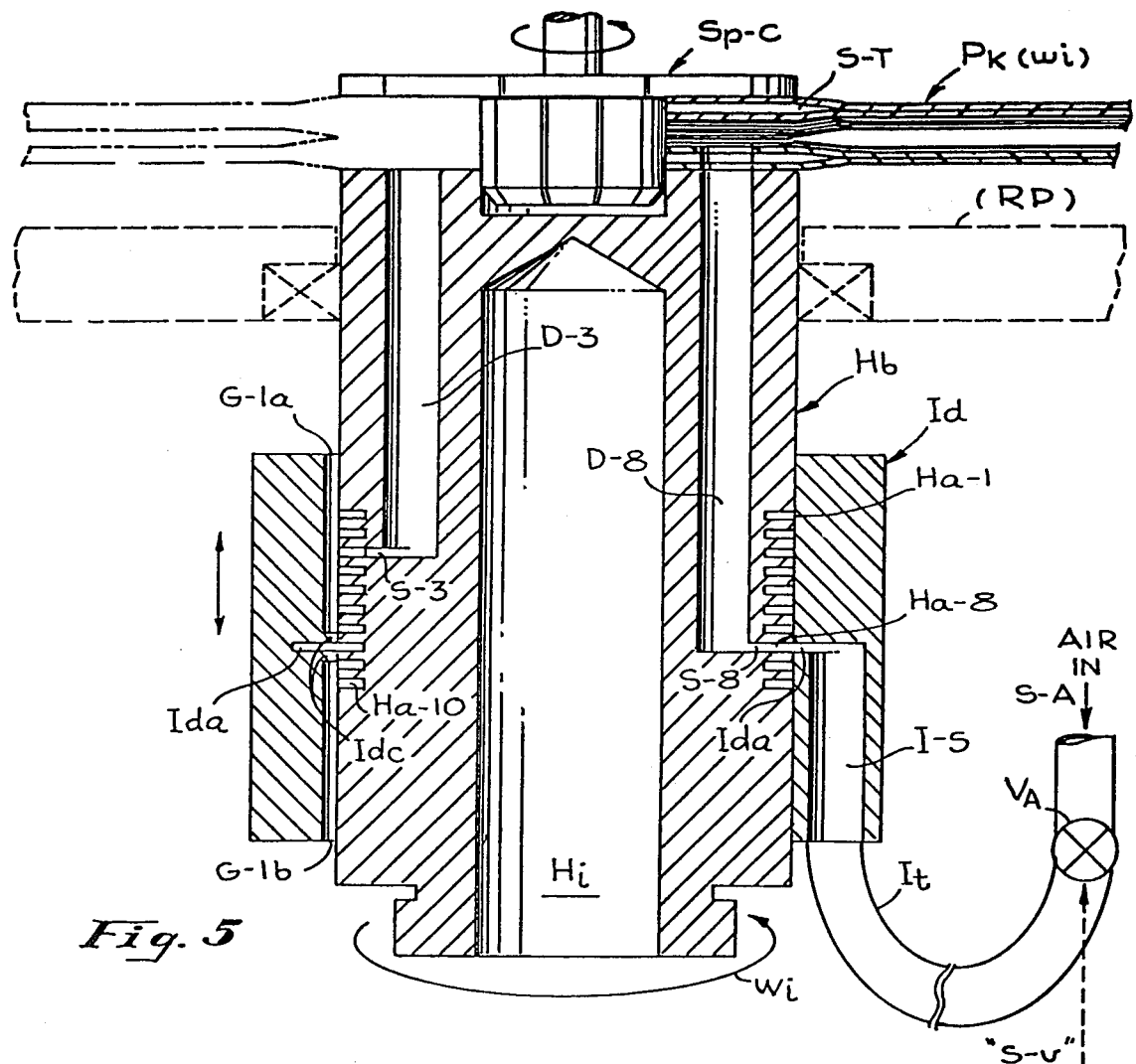
FIG. 5 is a side elevation in partial section of a disk pack similar to that in FIG. 1 mounted in operative relation with one type of a partitioning air supply-distributor arrangement.
Figure 6:
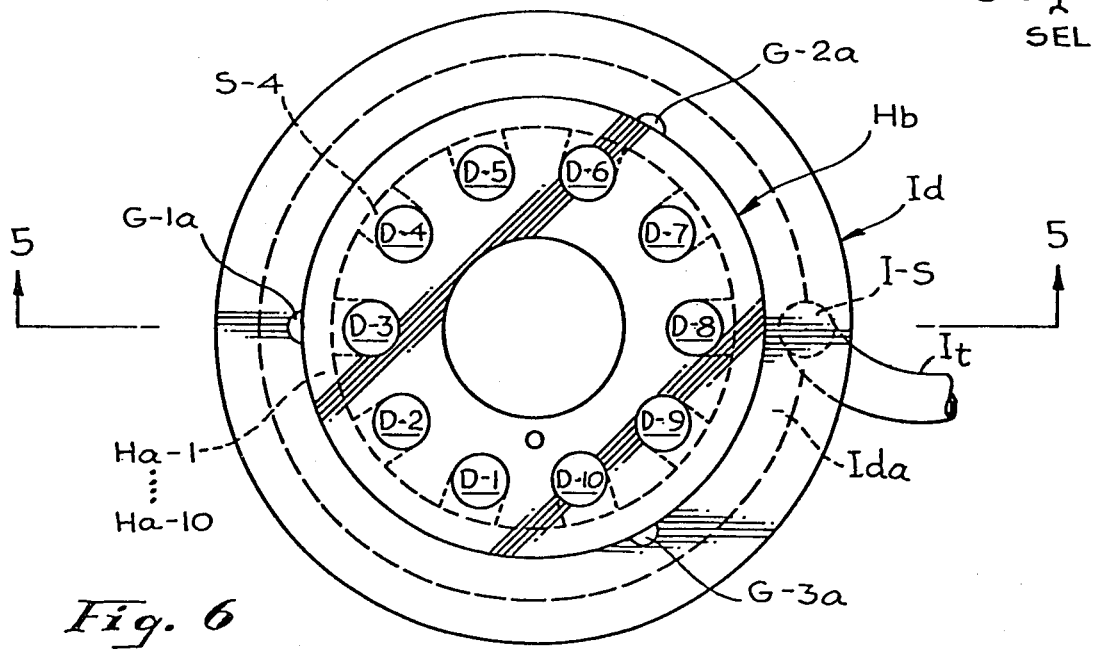
Figure 7:
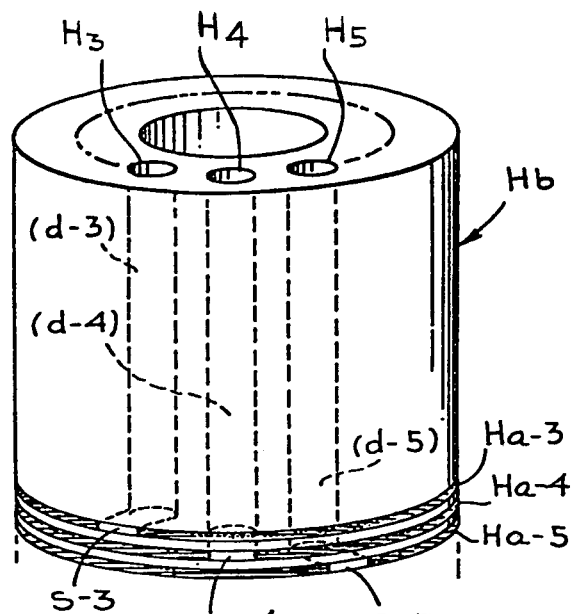
FIG. 7 is a side perspective and partial illustrative showing of details of the distributor-hub portion of this arrangement.

Alternate jet director means; FIGS. 5–7:

FIGS. 5–7 illustrate a variant external pneumatic partition-jet director means, modified and adapted (e.g., vs. that of FIG. 1) to pneumatically partition the disks of a prescribed flexible disk pack Pk like those aforedescribed except as otherwise noted. Pack Pk will be understood as conventionally rotated (e.g., being coupled to an upper insertable expandable coupling hub SP-C, as known in the art). The disks are adapted to be "centrifugally flattened" (as schematically indicated in FIG. 5) when rotated at the prescribed speed (e.g., several thousand rpm or more). Conversely, they will droop downwardly to rest upon a platform (indicated at RP, in phantom), conventionally provided, when pack rotation ceases. Partition-gaps will be opened, selectably, between the disks of pack Pk in the manner aforedescribed except as otherwise specified below (e.g., gap $g_{1-2}$ between disks FD-1, FD-2). Rotation of pack Pk is preferably initiated from below, via a "distributor tube" $H_b$, which is rotated conventionally in synchronism with pack Pk (i.e., at $W_i$ rpm, and by means not shown, but well known in the art; such as spindle means fitting into the hollow interior $H_i$ of tube $H_b$).

This "external" jet-select/distributor means indicated in FIGS. 5, 6 and 7 is a simple arrangement. It may be simplistically conceived as a pair of concentric hollow cylinders $H_b$, $I_d$ functioning as a non-rotating jet-select means $I_d$ and a cooperating jet-distributor means $H_b$ co-rotated with pack Pk. The distributor $H_b$ can be visualized as housing a circumferential array of communicating ducts (each communicating with one of the spacer-bores to exit at an associated inter-disk gap). Cylinder $H_b$ is surrounded by outer "Select-cylinder" $I_d$ connected to a source of pressurized air and adapted to be translated axially of cylinder $H_b$ so as to selectively couple pressurized air, pneumatically, to one of these ducts—the pressurized air source operating in a continuous mode, (though it may, optionally, be pulsed in certain instances).

Figure 8:
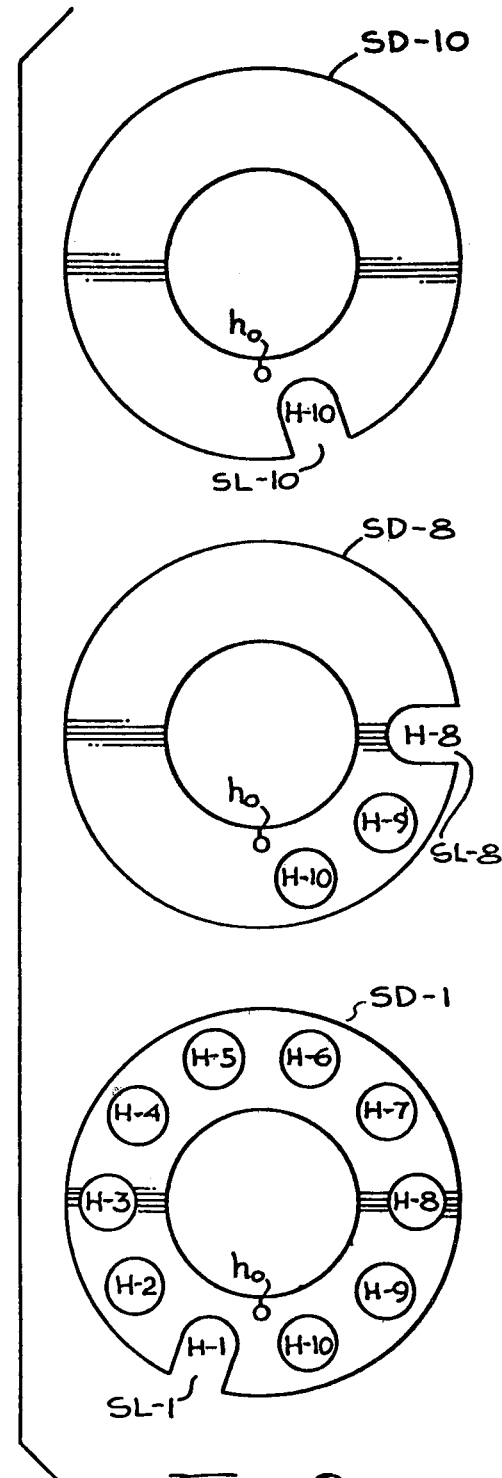
FIG. 8 shows in plan view partition-spacers according to a first embodiment, and adapted for use in the embodiment of FIGS. 5 to 7.

More particularly, a preferred form of inner "Distributor cylinder" $H_b$ will be understood as the embodiment shown (cross-sectionally) in FIG. 5 in combination with pack Pk and outer cylinder $I_d$—the cylinders being shown in plan view in FIG. 6, with the inner cylinder shown in the upper elevation of FIG. 7. FIG. 8 shows the associated stack of spacers SD fragmentarily. Distributor $H_b$ is a bore conduit and may be hollowed-out inwardly, as shown, to minimize mass.

Thus, considering FIGS. 5–8 workers will appreciate that an array of ducts D are disposed about the center of inner cylinder $H_b$, each having the same cylindrical cross-section and being adapted to communicate with a respective one of the bores formed by the registered partition-apertures H of spacers SD—each one of these bores terminating adjacent a respective inter-disk gap and communicating radially therewith, via a spacer cut-out SL.

Radially cut-out spacers, FIG. 8; embodiment I:

As suggested for the arrangement of FIGS. 5–8, eleven spacer disks are preferably provided for a 10-disk pack Pk, with partition apertures H-1 through H-10 provided in the bottom-most spacer SD, and with each successive spacer thereabove eliminating one more aperture. Thus, as FIG. 8 suggests, spacer SD-2 eliminates aperture H-1; SD-3 eliminates H-1 plus H-2 . . . , concluding with SD-8 which eliminates H-1 through H-7, SD-9 (not shown) and SD-10 which eliminates H-1 through H-9. The uppermost spacer SD-11 has no apertures H, of course.

The same kind of effect may be achieved using identically cut spacers—e.g., as for the embodiment of FIGS. 11, 12, described below. Each spacer SD (except SD-11) will be understood to include one or more apertures H, with a respective one thereof "cut-out" radially at a different respective site (e.g., aperture H-1 of spacer SD-1 so "cut-out", as are H-8 of SD-8, H-10 of SD-10, etc.).

The aperture-bores are formed by registering like-numbered apertures H with identically sited holes in the disks in stacking the pack. Each bore extends a different, unique distance, up through the pack, to exit opposite a different respective inter-disk gap g with which it is in pneumatic communication.

An extra hole (siting hole $h_o$) is preferably supplied in all the spacers SD to assure pack registration. When stacked in proper registration, aligned siting holes $h_o$ will form a single siting bore apt to receive an alignment pin on the hub. Workers may dispense with this expedient in favor of other known means.

Thus, in this embodiment there ten (10) "inter-disk" spacers, SD-1 through SD-10—each having a different respective radial communication ("cut-out" or slotting SL) to communicate with the corresponding inter-disk gap—e.g., slotting SL-1 communicates with the gap $g_{1-2}$ between disks FD-1 and FD-2, and connects the bore formed by apertures H-1 thereto.

Of course, alternatively, the spacers SD may be supplemented by separate inter-disk spacers, which in turn may be radially apertured as in prior art embodiments.

Distributor post $H_b$; FIGS. 5–7:

As mentioned, the Distributor $H_b$ performs the functions, among others, of communicating air-jet pressure to respective ones of these spacer-bores and communicating inter-disk gaps (along with such other functions as providing quiescent, "isolation air" flow; see below). Preferably, this is carried out in a manner which accommodates a prescribed convenient translation of Selector $I_d$ along tube $H_b$ (e.g., at convenient spaced intervals adapted to register the exit port thereof with a selected intra-tube conduit D—for details see cited U.S. Pat. No. 4,167,029).

"Selector" Sleeve $I_d$; FIGS. 5, 6:

The "Selector", an external hollow cylinder (jet-select means) or sleeve $I_d$, cooperates as described—and according to this invention—with companion cylinder $H_b$ so as to, among other things, direct a pressurizing jet pulse through a selected one of ducts D and through its corresponding gap (for details, including operations and results, see cited U.S. Pat No. 4,167,029).

"Isolation-air" via tube $I_d$; (FIGS. 5, 6):

According to another preferred feature hereof, Select cylinder $I_d$ also operates in conjunction with the mentioned inlet grooves Ha and associated ports S to supply a continuous stream of "isolation air" between all "non-selected" disk gaps. For this purpose an array of "breather slots" G are cut longitudinally along the inner periphery of "Selector tube" $I_d$—such as the three slots G-1, G-2, G-3 indicated in FIGS. 5 and 6 as symmetrically disposed about tube $I_d$ (upper portions G-1a, G-2a, G-3a being called-out in FIG. 6). These slots cooperate (along their upper and lower portions, about the intervening upper and lower breather plugs $I_{dc}$) to vent prescribed "non-selected" grooves Ha to the ambient atmosphere—whereupon the natural centrifugal "sucking" action in the inter-disk gaps g may draw-in ambient air, up these grooves and their associated ducts D (for further details see cited U.S. Pat. No. 4,167,029).

Operation; FIGS. 5–8:

An exemplary operational sequence for the embodiment of FIGS. 5–8 will now be described. It will be assumed that one desires to open a partitioning gap at $g_{7-8}$, (between disks FD-7 and FD-8 corresponding to the location of spacer SD-8); thus the following operations are invoked:

Step 1: Position Sleeve $I_d$:

A "partition-select" (disk-select) signal "p-s" is applied to the subject Disk Drive, causing generation of a translate signal "T-S", adapted to cause associated linear actuation means (not shown, but well understood in the art) to translate "SELECT sleeve" $I_d$ so as to register exit-annulus $I_{da}$ thereof in relatively air-tight relation with groove Ha-8.

Step 2: Pulse-in Air:

Once this sleeve registration is achieved, a related "air-on" signal "s-v" is applied to open valve $V_A$ (e.g., signal "s-v" can be generated and enabled by appropriate logic indicating this registration along with related preconditions). Signal "s-v" causes valve $V_A$ to be "actuated-OPEN" for a prescribed pulse period ($t_p$)—sending a prescribed, timed pulse of partitioning air from source S-A down inlet tube $I_t$. This jet pulse will issue through plenum chamber I-s to exit via groove $I_{da}$ into the "now-registered" facing groove Ha-8. This partition-jet enters duct D-8 via port S-8 and is conducted up D-8 to issue through the bore formed by registered spacer holes H-8 (registered with D-8). This jet pulse will exit therefrom, via exit slot SL-8 in spacer SD-8 (spanning selected gap g$_{7-8}$) to open the associated partition gap (g$_{7-8}$).

All the while (e.g., while tube I$_d$ is so moved and while this jet-pulse is sent to issue through gap g$_{7-8}$), "isolation-air" is being sucked-in to all ducts, etc. (grooves Ha, etc.) not blocked by the breather plugs I$_{dc}$, flanking Ha-8—thus grooves Ha-1 through Ha-7 suck-in ambient air via slots G-1$a$, G-2$a$, G-3$a$; and grooves Ha-9, Ha-10 suck-in via slots G-1$b$, G-2$b$, G-3$b$.

Figure 9:
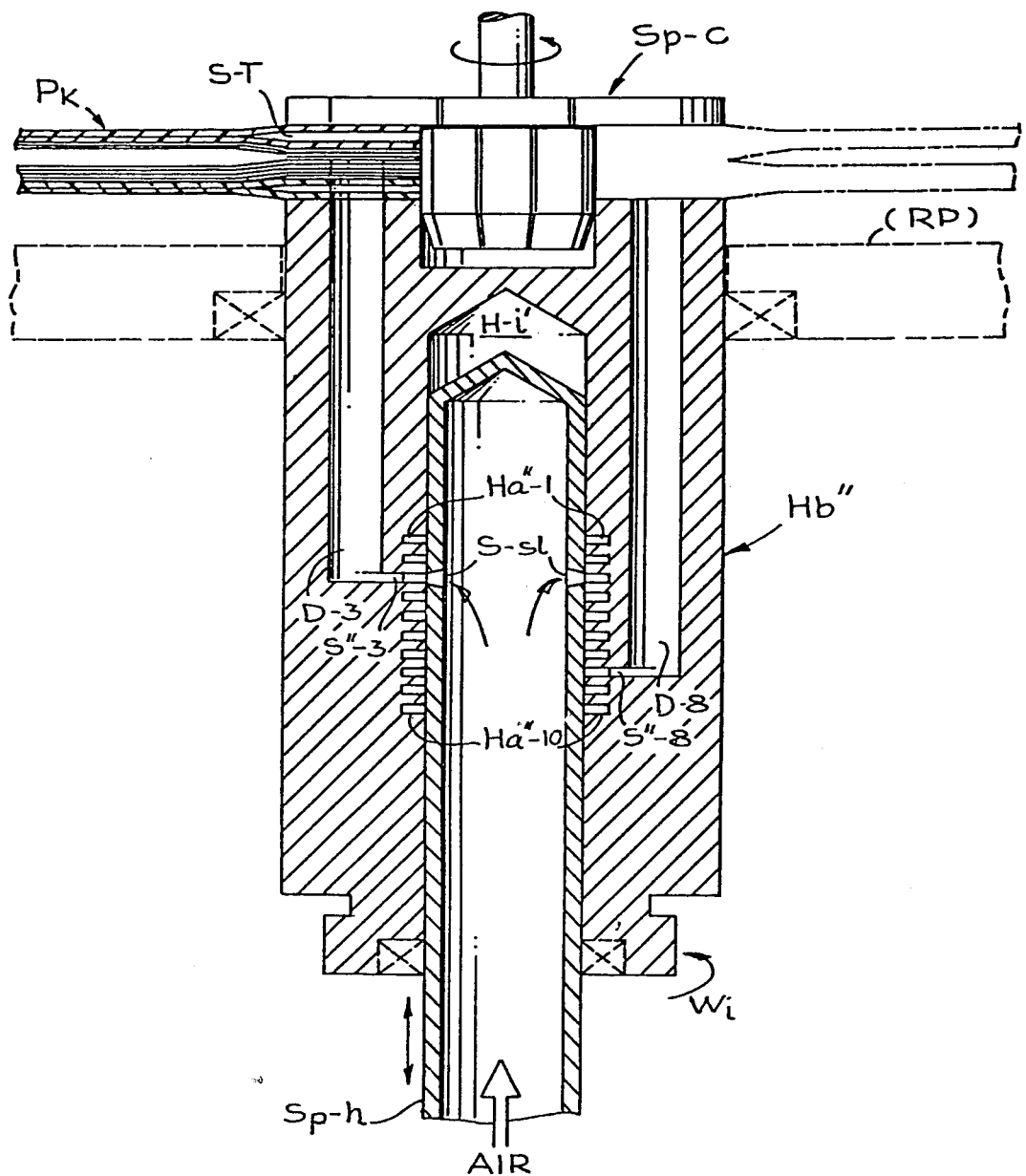
FIG. 9 shows an alternate jet director arrangement modified from that shown in FIG. 5.

Alternate Director; FIG. 9:

FIG. 9 illustrates an alternate jet director means after the manner of the (similarly-illustrated) embodiment in FIG. 5. It will be understood as constructed and operated the same except as otherwise specified.

Among other things, this embodiment substitutes an inner select tube Sp-h for the "Select-sleeve" I$_d$ in FIG. 5, etc. Also, it modifies the inlets (Ha, S) to ducts D accordingly; i.e., to face inwardly, in communication with tube Sp-h (exit-port S-sl thereof), as illustrated (for other details and operation see cited U.S. Pat. No. 4,167,029).

Figure 10:
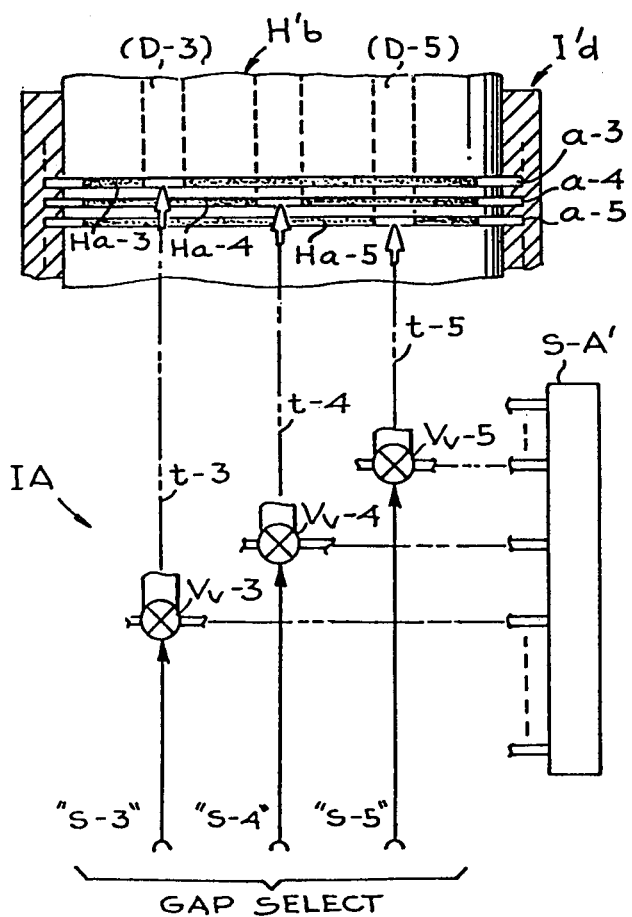
FIG. 10 shows a second alternate jet director arrangement modified from that indicated in FIGS. 5 and 9 and adapted to provide jet selection without mechanical positioning or translation of parts.

Second Alternate Director; FIG. 10:

FIG. 10 illustrates another modification of the jet Director means. This embodiment will be understood as constructed and operated in the same manner as that of FIGS. 5-8, except as otherwise specified. Here, as a principle modification, the outer "Select sleeve" I$_d$ of FIGS. 5-7 is modified so as to be completely stationary (and not be linearly translated for duct-selection); being provided with an array IA of air supply tubes t, each tube being operatively associated with a respective valve V$_v$ adapted to selectively apply pressurized air thereto from a common source (see manifold S-A'). Each tube t will, in turn, communicate with a respective duct (groove Ha, duct D and associated intermediate port S communicating therebetween, for further details, see cited U.S. Pat. No. 4,167,029).

To illustrate operation of the FIG. 10 array, assume that one wishes to partition at the gap g$_{5-6}$ of spacer SD-5—with a pressurized pulse to be sent up duct D-5 through the bore formed by spacer apertures H-5 to exit through SD-5, etc. For this, a prescribed valve-opening signal "s-5" (from Gap-Select control means, not illustrated but implemented as understood in the art) will be understood as applied to open valve V$_v$-5 for a prescribed period. This will send a burst of pressurized air from manifold S-A' down through tube t-5 to be thrust about groove a-5 and over to facing groove Ha-5, so as to enter duct D-5, via inlet port S-5, (in the manner of the embodiment of FIG. 5).

Figure 11:
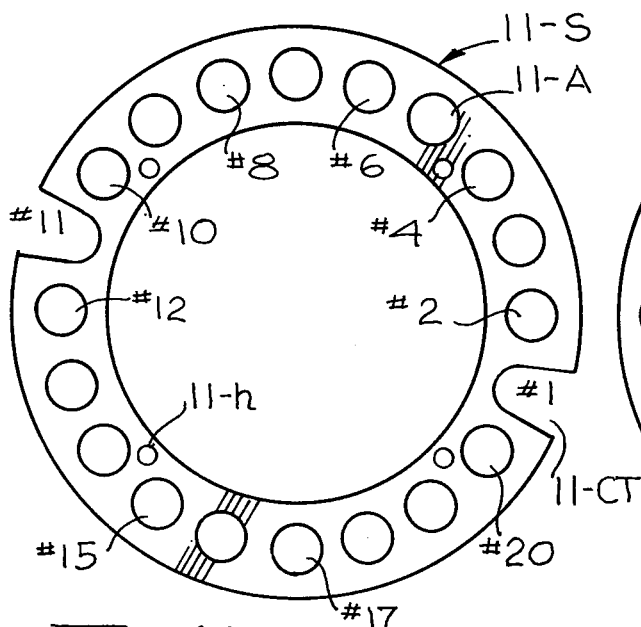

Second embodiment; FIGS. 11, 12:

FIG. 11 illustrates a modified spacer 11-S, generally like spacers SD (FIG. 8), except that it is a "single-stamping" design to be used throughout a certain disk pack—i.e., each floppy disk in the pack will be understood as identical, being formed with 20 apertures, each to be registered with one of the spacer-apertures 11-A and having one of the identical spacers 11-S on each side thereof. Each of the identical spacers 11-S also has a set of clamp post holes 11-h; (four shown) each adapted to receive a clamping post for securing the stack. Each spacer 11-S also has a pair of radial vents or cut-outs (see 11-ct at apertures #1 and #11 in FIG. 11), and is differentially stacked so cut-outs 11-ct fall at different successive aperture sites of the stacked disks, [e.g., with 20 identically numbered holes hh in the stacked disks, registering with apertures 11-A, #1 through #20, of the spacers 11-S one might position the "first" spacer 11-S on the "first" inter-disk gap so that cut-outs 11-ct register with holes #1 and #11 of the disks; then position the "second" spacer to be "rotated-by-one" so that its cut-outs registered with disk holes #2 and #12, and so on, rotating each spacer "by-one" as one proceeded up the disk stack].

In this fashion, spacers 11-S will be stacked between respective disks so that their cut-outs service (direct air to) a different respective inter-disk gap. For instance, gap #g-1 lies, just below the bottommost disk D-1 in the stack, would be jet-serviced by bores #1 and #11 (extending through the pack) since these would be registered with spacer cut-outs 11-ct as shown in FIG. 11; gap g-2 between D-1 and D-2 (D-2 overlying D-1) is fed via bores #2 and #12 (registering with cut-out apertures in its spacer, "rotated-by-one" from that.

Figure 12:
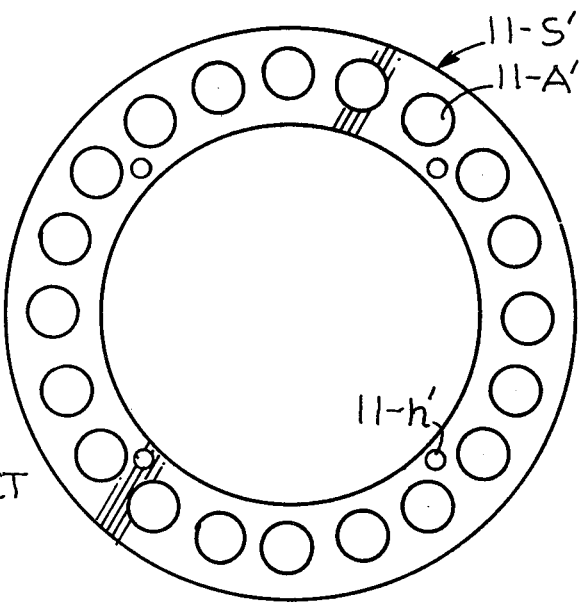
FIG. 12 is a like view of an associated end-spacer design.

Companion end-spacers 11-S' are shown in FIG. 12 and will be understood as identical to spacers 11-S except that they have no radial venting (no cut-outs 11-ct)—being intended to be used between end-plate disks (e.g., in end-plates EP, EP' of FIG. 1).

Operation:

Thus, for example, if such a pack is assembled and placed in a suitable accommodating disk drive assembly (e.g., as described above) and spun-up, partitioning between disks D-6 and D-7 (i.e., gap g-7) would be invoked by directing the jet stream up through pack bores #7 and #17 (registered with spacer apertures #7 and #17, here cut-out). This stream would traverse the pack axially to exit at gap g-7 (via opposed vents 11-ct, there), being circumferentially swept out by rotation of the pack. In particular, each stream would proceed up its respective bore to the top of the pack, being blocked there by upper end-plate EP, to issue from its radial vent as the only "relief path".

Figure 13:
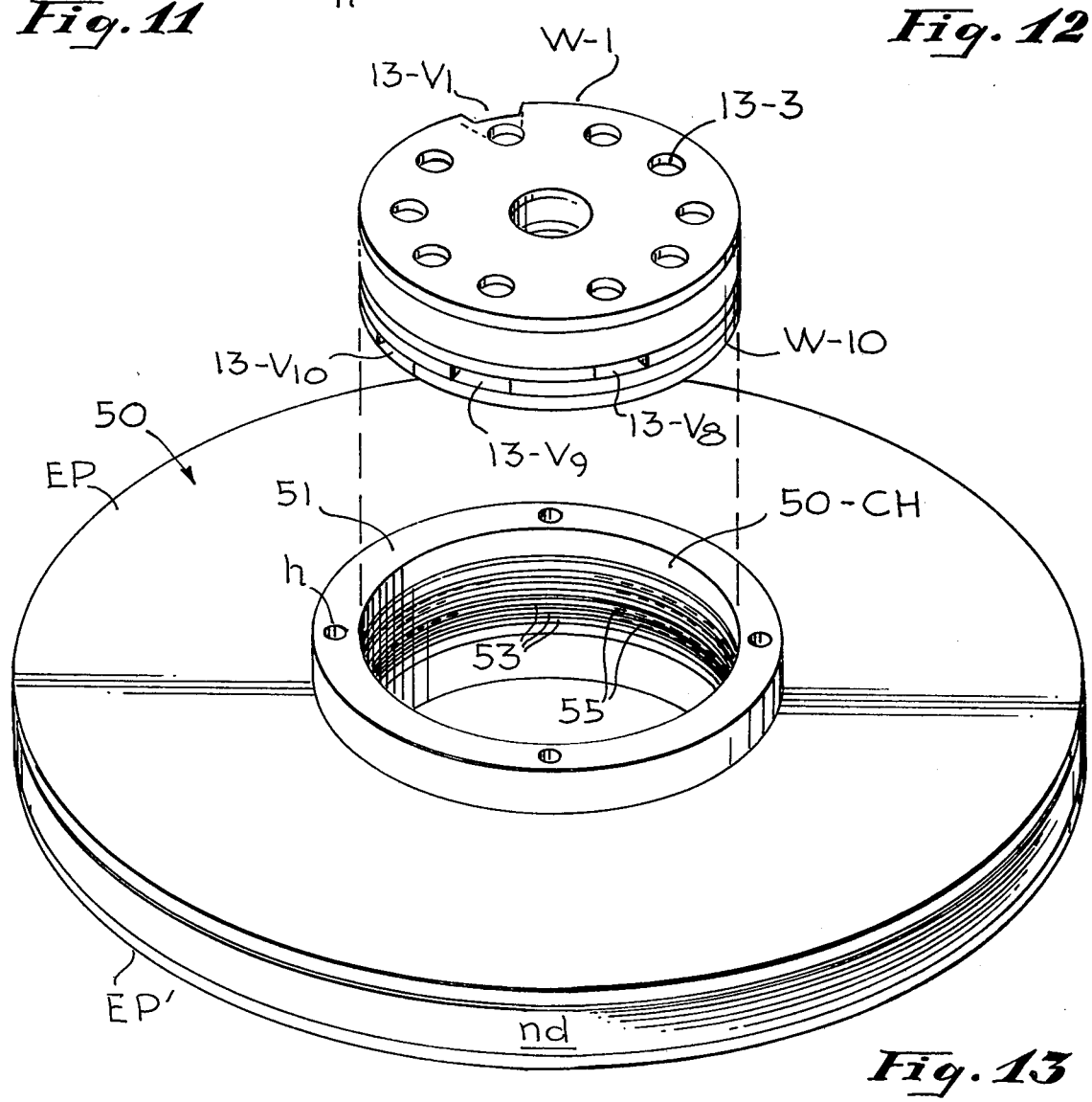
FIG. 13 shows a like stack of such spacers arranged to be disposed in the pack center-hole rather than between disks.

Third Embodiment; FIG. 13:

FIG. 13 indicates another variant use of such "radially vented" spacer means—this time assembled into a prescribed cylindrical partition plug 13-p embodiment as part of a "partitioning piston" array (not shown) adapted to selectively partition a floppy pack 50 of relatively known construction.

FIG. 13 indicates a flexible disk pack 50 in exploded relation with the associated partitioning piston, of which plug 13-p is a part. Pack 50 is preferably the removable cartridge type (as known in the art) and may include a surrounding protective envelope or shroud, with suitable ports for air exchange. Pack 50 is comprised of a coaxial stack of identical, commonly-supported, flexible disk records 55, understood as mounted and retained, along with intermediate conventional spacers 53, between a pair of opposed flexible end plates, EP, EP', being clamped between collars 51, 51'. Disks 55 are spaced apart a prescribed uniform distance by identical annular separator rings 53 which are radially-vented, or made radially "air permeable". The array of disks and inter-disk spacers is clamped firmly between end plates EP, EP' by a pair of opposed collars 51, 51' using means known in the art (e.g., with bolts or rivets threaded through holes h in collars 51, disks 55 and spacers 53; or by like fastener means as understood by workers in the art). The inner circumferences of disks 55, of spacers 53 and of collars 51, as so stacked and clamped together, are relatively congruent to define the sides of a cylindrical center hole 50-CH of prescribed diameter and height as known in the art. Plug 13-p will be understood as disposed in hole 50-CH so that respective radial-vented holes 13-v are aligned to communicate with associated inter-disk gaps (e.g., hole 13-$v_1$ with the uppermost gap $g_1$, 13-$v_{10}$ with the lowermost gap $g_{10}$, etc.). Workers will recognize that special pains must be taken to assure this alignment—something very difficult for a removable pack.

Flexible disks 55 and spacers 53 are of a type known in the art and, as workers will appreciate, may assume various dimensions and compatible constructions. A typical flexible disk comprises a thin polyester disk substrate, usually one to several mils thick (e.g., a well-known polyethylene terephthalate a few mils thick—1.5 mils preferred here—with a randomly oriented ferric oxide coating; disk diameter being approximately 12 inches with a center-hole about 2.5 inches in diameter). The disk will have a magnetic coating on at least one side to thus define a magnetic recording surface.

According to one feature hereof, flexible disks 55 are retained in a pack between a pair of flexible stabilizer end plates EP, EP'. These plates are adapted to have a prescribed compliance (e.g., to accommodate a "self-flattening" action of the plates under the centrifugal forces generated at the operating rpm). Such a flexible end plate is an advantageous feature and is very simple to provide; for instance, preferably comprising a plurality of contiguous flexible recording disks 55 (identical to the record disks, except that no magnetic coating is needed). Plates EP, EP' fix the pack position axially and each cooperates with a respective adjacent record disk to form a prescribed "channel" defining the intervening air flow. Thus, the plates should be quite flat and are so rendered by centrifugal forces. Workers will appreciate the unique advantages of such flexible end plates—such as their "self-flattening" character as opposed to in Griffiths, et al. U.S. Pat. No. 3,969,767.

With such a convenient construction the number (thickness) of flexible disks joined to form an end plate (by any suitable clamping or adhesive means) will serve to establish the proper degree of stiffness—being sufficiently stiff to hold the pack together (i.e., limit the bending flexure of diverted disks without, itself bending thus keeping disks from whirling and flopping about); yet flexible enough to be self-flattening under contemplated operating conditions. Preferably, the end plates are fabricated to exhibit the same width (ID and OD) as the recording disks held between them. Workers will recognize the saving over metal plates that is realized (e.g., since metal plates must be finished and also mounted to render the necessary flatness and spindle-alignment—not being "self-flattening" or "self-aligning"). Other related flexible material may be used to construct such flexible end plates as appreciated by workers in the art (see also U.S. Pat. No. 4,118,746).

Spacers:

Recording disks 55 are separated by annular (vented) spacer rings 53. Spacers 53 will be understood as identical, serving to maintain disks axially spaced a prescribed uniform separation distance (here, about 10 to 20 mils preferably). The spacers may be unilaterally "crenelated"; and perforated relatively uniformly to leave relatively identical radial ridges spaced regularly about the ring's circumference—thereby accommodating a centrifugal air flow (radially-out from within the pack center 50-CH). Other forms of spacers which are "crenelated", or otherwise "radially-vented", will occur to workers in the art.

More particularly, vented ring spacers 53 help to maintain recording disks 55 normally separated and lubricated by a thin film of air, as well as serving, during special partition times, to pass partitioning air jets. Workers will recognize that such pneumatic separation depends upon the clearance dimension CL between the outer side walls of cylinder 40 and the inner walls of pack center-hole 50-CH as indicated in FIG. 2. If this clearance is not above a certain minimum, a vacuum will result between disks 55, pulling them together; whereas if it is too large the air-flow between disks may agitate them.

Use and operation of disk pack; partition-plug:

Workers in the art will recognize that flexible disk packs such as those above described may be constructed in various ways and adapted for various advantageous applications. Such packs will be recognized as particularly apt for use with interior "pneumatic partitioning" means, such as with the cylindrical partitioning plug 13-p described herein. For this reason it will be useful to further consider the construction and operation of such a partitioning cylinder.

Partitioning hub, or cylinder 13-p is adapted to direct a "disk-parting" air jet radially-outward through a disk pack like those described (including vented spacers) and will be understood as comprising a stack of plates W, each identically apertured and having (one or more) radial-vents 13-V (e.g., in the manner of spacers 11-S of FIG. 11). Thus, when plug 13-p is properly positioned in center-hole 50-CH of pack 50 and the pack and plug spun-up to be synchronous, partition air will be drawn up a selected bore through plug 13-p and will issue radially out through the associated vent 13-V, and projected into the associated inter-disk gap g, traversing the associated intermediate vented spacer 53.

The advantages of such a plug 13-p will be very evident to workers. For instance, it may be favorably compared with the well known single-slit plunger that must be moved axially, and with high precision and high speed, to effect each such partition (compare U.S. Pat. No. 4,118,746). Such a plug by contrast requires no positioning translation at all.

The results achievable with such radially vented spacers will be gratifying to workers in the art; for instance, the desirable "end-wise", externally-originated (directed) pneumatic partitioning may be easily achieved with only a few conventional elements, involving the delivery and direction of partition air.

Conclusion:

While some described embodiments have preferably involved a removable cartridge (form of floppy disks pack), workers will understand that the instant invention may be used with any such disk arrangements, such as a fixed array of floppy disks stacked fixed along a prescribed (horizontal or vertical) axis and susceptible of "end-wise" partitioning.

Workers in the art will recognize many features of advantage and surprising novel utility deriving from device design and construction along the described lines. They will recognize that, using such designs, pack structure may be improved and simplified—the associated jet delivery, spacer apertures and vents, etc., being simple to manufacture and convenient to use. And where disks and spacers are not "partition-apertured", one may substitute a like-apertured plug as in FIG. 13.

A variety of packs will be seen adapted for advantageous interaction with such central pneumatic partition-delivery means of the type described, wherein the natural centrifugal pumping action of the pack under high speed rotation assists in establishing a stable air film-separation of disks, while also assisting in pneumatic partitioning. The versatile, fast, simple partition control facilitated (e.g., with the mere introduction of the partition jet into a selected axial conduit) will be appreciated, especially since it affords a partition which is entirely pneumatic, with no intrusion of mechanical elements into the pack, (e.g., none translated within the hub). The flexible disk packs and associated manipulation means contemplated herein will be understood by workers in the art to have special utility for certain "high performance" (high rpm), out-of contact recording applications.

It will be understood that the preferred embodiments described herein are only exemplary, and that the invention is capable of many modifications and variations in construction, arrangement and use without departing from the spirit of the concepts taught. As an example of further modifications, the means and methods disclosed herein may, in certain cases, also be applicable with certain other transducing systems and the like, as well as being applicable in conjunction with other supplementary partition means.

All variations of the invention being merely illustrative, the invention should be considered as including all possible modifications and variations coming within the scope of the invention as defined by the appended claims.

What is claimed is:

1. An improved recording arrangement comprising a flexible disk pack adapted to be pneumatically partitioned end-wise, this pack being characterized by stacked flexible disks with intermediate spacer means, with an array of partition-bores extending axially through the pack cross-section, each bore terminating at a different inter-disk gap for conducting separating air thereto; said spacer means each comprising an annulus including an array of apertures adapted to register with said bores, at least one of these apertures being cut-out radially so as to conduct a partition air stream radially to an associated inter-disk gap.

2. The invention in accordance with claim 1, wherein each spacer means comprises an identical washer identically partition-apertured to generate said bores.

3. The combination as recited in claim 1, the spacers and disks being stacked and apertured in registration such as to generate said array of partition-bores extending axially of the pack, and arranged circumferentially adjacent its hub, with each bore terminating at a different respective inter-disk gap, via an associated spacer-venting cut-out.

4. The combination as recited in claim 1, as combined with pneumatic partition means disposed external to said pack and including director means adapted to direct a pressurized air jet to at least one of said pack bores by way of effecting a "partition-select" operation.

5. An "end-wise partitioned" disk pack comprising:
a plurality of flexible recording disks and intermediate spacer means, all apertured so as to generate an array of partition bores, each bore communicating with a respective inter-disk gap;
said pack being adapted for co-operation with external pneumatic partition means adapted to partition the pack and expose a selected disk surface by selectively directing a jet of pressurized air through a selected one of said bores;
each said spacer means being characterized by at least one radial cut-out extending radially from an associated aperture.

6. An improved method of partitioning a flexible disk pack which includes disks and intermediate spacers characterized by an array of partition bores extending axially, end-wise of the pack, this method comprising the steps of:
forming each said spacer to include at least one radial venting cut-out extending between a bore aperture and the edge thereof;
stacking said spacers between respective disks so that the cut-outs of each spacer is connected with the partition bore intended for that respective inter-disk gap; and
operating said pack and associated drive and pneumatic supply means so as to apply partition air to a bore corresponding to the inter-disk gap "selected" for transducing at any given time.

7. In an improved disk pack adapted for pneumatic partitioning, this pack including an array of conduit means, each conduit means being adapted to direct a partitioning air stream axially and up through the pack to introduce a partitioning gap at the interface between selected disks; this pack including:
spacer means axially adjacent each disk and including radial vent means pneumatically communicating with said interface.

8. An improved recording arrangement comprising a pack of record disks adapted for end-wise partitioning, this pack including conduit means for conduction of partitioning force, axially through the pack, to introduce a prescribed partition gap at the interface between selected adjacent disks; associated disk drive means and
pneumatic partition means arranged and adapted to selectively present partitioning pneumatic forces into at least a portion of said conduit means so as to introduce said gap at any selected interface; said pack including radially-vented spacer means.

9. Improved spacer means for insertion between the flexible disks in a floppy disk pack adapted to be pneumatically partitioned end-wise, this pack being characterized by an array of partition-bores extending axially through the disks and the pack cross-section and adapted for conducting separating air to selected inter-disk gaps; said spacer means each comprising an annulus including an array of apertures adapted to register with said bores, with at least one of these apertures being cut-out radially so as to conduct a separation air stream radially to the inter-disk gap associated with the given annulus.

10. The invention in accordance with claim 9, wherein the spacer means comprise identical washers identically partition-apertured and stacked so the registered apertures generate said bores.

11. The combination as recited in claim 10, wherein each washer is so cut-out and so stacked as to conduct separation/portion air to its associated gap when the communicating bores are pressurized for this.

* * * * *